US009878569B2

(12) United States Patent
Niu et al.

(10) Patent No.: US 9,878,569 B2
(45) Date of Patent: Jan. 30, 2018

(54) MEDIA COMPOSITION

(75) Inventors: Bor-Jiunn Niu, San Diego, CA (US); Haigang Chen, San Diego, CA (US); Lisa A. Underwood, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 492 days.

(21) Appl. No.: 14/391,490

(22) PCT Filed: Apr. 12, 2012

(86) PCT No.: PCT/US2012/033183
§ 371 (c)(1),
(2), (4) Date: Oct. 9, 2014

(87) PCT Pub. No.: WO2013/154559
PCT Pub. Date: Oct. 17, 2013

(65) Prior Publication Data
US 2015/0037519 A1 Feb. 5, 2015

(51) Int. Cl.
*B41M 5/00* (2006.01)
*B41M 5/52* (2006.01)
*C09D 123/08* (2006.01)
*C09D 129/04* (2006.01)
*B05D 1/26* (2006.01)
*B05D 5/04* (2006.01)
(Continued)

(52) U.S. Cl.
CPC ........... *B41M 5/5254* (2013.01); *B05D 1/265* (2013.01); *B05D 5/04* (2013.01); *B41M 5/52* (2013.01); *C09D 123/08* (2013.01); *C09D 129/04* (2013.01); *B41M 5/44* (2013.01); *B41M 5/506* (2013.01); *B41M 5/508* (2013.01); *B41M 2205/32* (2013.01); *B41M 2205/38* (2013.01); *B41M 2205/40* (2013.01); *Y02P 20/582* (2015.11)

(58) Field of Classification Search
CPC ...... B41M 5/5254; B41M 5/52; B41M 5/508; C09D 123/08; C09D 129/04; B05D 1/265; B05D 5/04
USPC .................. 428/32.28, 32.31, 500
See application file for complete search history.

(56) References Cited

U.S. PATENT DOCUMENTS 4,746,562 A 5/1988 Fant
4,816,521 A 3/1989 Asrar
(Continued)

FOREIGN PATENT DOCUMENTS

CN 1291201 4/2001
CN 1944548 4/2007
(Continued)

OTHER PUBLICATIONS

Soarnol Technical Data Sheet—Mar. 8, 2013 (3 pages).*

*Primary Examiner* — Betelhem Shewareged
(74) *Attorney, Agent, or Firm* — Thorpe, North & Western L.L.P.

(57) ABSTRACT

Described herein is a media composition. The media composition includes a substrate and an ink receiving layer that includes binder that includes an ethylene-vinyl alcohol copolymer with a glass transition temperature of 75 degrees Celsius or less, a melting point temperature of 175 degrees Celsius or less, and/or a crystallization temperature of 150 degrees Celsius or less. The ink receiving layer can be applied to a substrate using extrusion techniques.

13 Claims, 2 Drawing Sheets

(51) Int. Cl.
*B41M 5/44* (2006.01)
*B41M 5/50* (2006.01)

(56) References Cited

U.S. PATENT DOCUMENTS

| | | | |
|---|---|---|---|
| 5,853,965 A * | 12/1998 | Haydock et al. | 430/496 |
| 6,153,714 A * | 11/2000 | Bansleben et al. | 526/348.1 |
| 6,214,458 B1 | 4/2001 | Kobayashi et al. | |
| 6,562,451 B2 | 5/2003 | Syoda et al. | |
| 7,332,025 B2 | 2/2008 | Shida et al. | |
| 2002/0160162 A1 | 10/2002 | Kawai et al. | |
| 2004/0048006 A1 | 3/2004 | Venkatasanthanam et al. | |
| 2004/0234709 A1 | 11/2004 | Ishida et al. | |
| 2005/0025911 A1 | 2/2005 | Kasperchik et al. | |
| 2006/0222789 A1 | 10/2006 | Dontula et al. | |
| 2007/0054070 A1 | 3/2007 | Laney et al. | |
| 2007/0275190 A1 | 11/2007 | Chen et al. | |
| 2011/0171489 A1 | 7/2011 | Dou et al. | |

FOREIGN PATENT DOCUMENTS

| | | | |
|---|---|---|---|
| EP | 1022309 | 7/2000 | |
| JP | 2006058838 | 3/2006 | |
| WO | 9320111 | 10/1993 | |
| WO | 9720697 | 6/1997 | |
| WO | WO 2012047203 A1 * | 4/2012 | C09D 11/02 |

* cited by examiner

| | Soarnol E3808 | G-Soarnol GS654B |
|---|---|---|
| Chemistry | ethylene-vinyl alcohol | ethylene-vinyl alcohol |
| Ethylene Content | 38% | 38% |
| Melting Point (deg. C) | 173 | 160 |
| Crystalization Temp. (deg. C) | 152 | 129 |
| Crystallinity | Higher | Lower |
| Amorphism | Lower | Higher |

| | Control 1 | Control 2 | Ex. 1 | Ex. 2 | Ex. 3 | Ex. 4 |
|---|---|---|---|---|---|---|
| G-Soarnol SG634 | | | 100% | | 80% | |
| G-Soarnol SG654B | | | | 100% | | 80% |
| Soarnol E3808 | 100% | 80% | | | | |
| Orevac 9304 | | 20% | | | 20% | 20% |

|  | Control 1 | Ex. 1 | Ex. 2 | Control 2 | Ex. 3 | Ex. 4 |
|---|---|---|---|---|---|---|
| Color Gamut, 72-color | 229042 | 237347 | 292829 | 249511 | 247181 | 309410 |
| Average Image Gloss, 60 degree | 13 | 11 | 17 | 9 | 9 | 14 |

FIG. 4

|  | Control 1 | Ex. 1 | Ex. 2 | Control 2 | Ex. 3 | Ex. 4 |
|---|---|---|---|---|---|---|
| Water Rubbing | 3 | 3 | 3.5 | 2.5 | 3 | 4.5 |
| Windex Rubbing | 1.5 | 1.5 | 2 | 1.5 | 2 | 2.5 |
| Dry Rubbing | 1 | 1 | 2 | 1 | 2 | 3.5 |

FIG. 5

|  | Control 2 | Ex. 3 | Ex. 4 |
|---|---|---|---|
| Polymer Miscibility | 2 | 3.5 | 4.5 |

FIG. 6

|  | Control 1 | Ex. 1 | Ex. 2 |
|---|---|---|---|
| Melting Temp. (deg. C) | 173 | 175 | 160 |
| Glass Transition Temp. (deg. C) | 58 | 59 | 53 |
| Crystallization Temp. (deg. C) | 152 | 153 | 129 |

FIG. 7

MEDIA COMPOSITION

BACKGROUND

Media used for large format printing is traditionally made from polyvinyl chloride (PVC). PVC is especially useful for outdoor signage since it is weather resistant and fade resistant. However, while the weather resistance of PVC offers advantages, the weather resistance also means that PVC does not readily degrade or disintegrate in a landfill compared to cellulosic materials. Another undesirable attribute of PVC is that it has a poor recyclability.

The presence of chloride in PVC leads to additional environmental concerns. Global environmental pressures are pushing the printing industry to reduce the use of PVC. But when used in large format printing applications, media made from materials other than PVC may suffer from poor performance when printed with latex inks by large format printers.

BRIEF DESCRIPTION OF THE DRAWINGS

FIG. 4 is a chart illustrating image quality properties of media with different ink receiving layers.

FIG. 5 is a chart illustrating durability properties of media with different ink receiving layers.

FIG. 6 is a chart illustrating manufacturability properties of media with different ink receiving layers.

FIG. 7 is a chart illustrating physical properties of media with different ink receiving layers.

DETAILED DESCRIPTION

Figures 1, 2, 3:
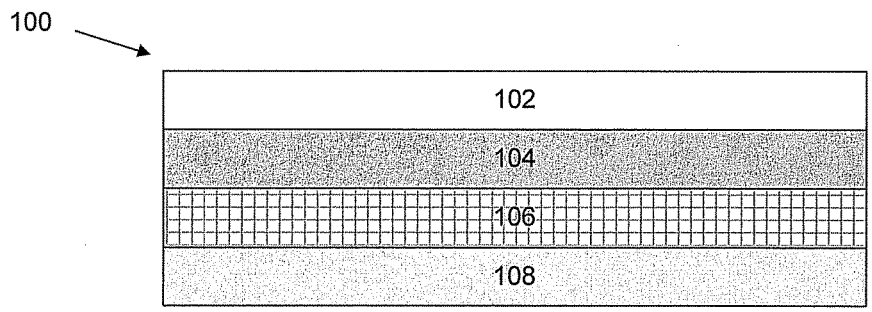
FIG. 1 is a schematic illustration of a media.
FIG. 2 is a chart illustrating the properties of Soarnol E3808 and G-Soarnol GS654B.
FIG. 3 is a chart illustrating experimental compositions of the ink receiving layer.

Described herein is a media for receiving printed images thereon. The media is made from materials other than PVC, but does not suffer the negative attributes of non-PVC media. The media described herein includes a substrate and an ink receiving layer that contains a polymeric binder. The polymeric binder includes an extrudable, amorphous ethylene-vinyl alcohol (EVOH) co-polymer with a lower glass transition temperature, lower melting point temperature, and/or a lower crystallization temperature than a traditional EVOH co-polymer. The media can provide improved performance in large scale printing applications compared to other media that does not contain PVC.

As used herein, "improved performance" compared to other media that does not contain PVC generally refers to improved properties related to "image quality." "Image quality" refers to the fullness, intensity, clarity and overall image characteristics of ink after application to the media. Measures of image quality include color gamut, optical density, and the like. The "improved properties" can also refer to improved resistance to smearing or blurring when rubbed or otherwise physically engaged with a variety of objects.

The media described herein can be utilized with a wide variety of printing systems. Particular reference is made to printing systems that can facilitate large format printing applications. Large format printing can be used in the creation of banners, posters, signage, and the like. Large format printing can produce products for both indoor applications and outdoor applications. Examples of printing devices that facilitate large format printing include printers available from Hewlett-Packard under the DESIGNJET™ trade name. Other printing devices include thermal ink jet printing devices, piezoelectric ink jet printing applications, and other forms of ink jet printing.

Referring now to FIG. 1, illustrated is a schematic illustration of a media 100. The media can include an ink receiving layer or inkjet receiving layer 102, a tie layer 104, and a substrate layer 106 and 108 (the substrate can include a woven part 106 and an extruded part 108).

When used herein, the term "media" refers to any type of media used for printing applications. Media for large format printing applications is described herein for exemplary purposes only. However, the media is not restricted to any particular size. Additionally, the media can have any component types, material-selections, arrangement of media materials or structures, chemical compositions, layering sequences, numbers of layers, layer orientations, thickness values, porosity parameters, material quantities, and other related factors unless expressly stated.

The media is not ink-specific. Since the media is not ink-specific, the media can be used in connection with a variety of inks, dyes, pigments, liquid toner compositions, solid toner compositions, sublimation dyes, waxes, latex, solvent, eco-solvent, UV curable and the like.

The substrate 106 and/or 108 can be of any dimension. The dimension can be any size or thickness. As an example, the substrate 106 and/or 108 can have a uniform thickness or a non-uniform thickness. The thickness can be from 0.025 mm to 1 mm. In another example, the thickness can be from 0.15 mm to 0.25 mm. Although a substrate size suitable for large format printing applications (using printers with print width between 36 inches and 126 inches) is described for exemplary purposes herein, the substrate 106 and/or 108 can be of any size.

The substrate 106 and/or 108 is made of any material suitable for printing. The material can include any combination of pulp, wet paper, dry paper, or the like. The substrate 106 and/or 108 can be fibrous and/or porous. The substrate 106 and/or 108 can be in a flat sheet, a roll, a web, a strip, a film, or the like. The substrate 106 and/or 108 can have transparent, semi-transparent and/or opaque characteristics.

The substrate 106 and/or 108 can be made from any material suitable for printing provided that the material does not include chloride. For example, the substrate 106 and/or 108 is not made from PVC. The substrate 106 and/or 108 can include cellulosic wood, cloth, non-woven fabric, woven fabric, felt, synthetic or non-cellulosic paper, glass or glass-containing products, metals, polyester or any combination or mixture thereof. Various organic polymer compositions can be employed to form the substrate 106 and/or 108.

Polyolefins are examples of organic polymer compositions that can be employed to form the substrate 106 and/or 108. Polyolefins are a class of polymers derived from one or more simple olefin monomers. An olefin is an unsaturated chemical compound containing at least one carbon-to-carbon double bond. The simplest acyclic alkenes with only one double bond and no other functional groups form a homologous series of hydrocarbons with the general formula $C_nH_{2n}$.

Types of polyolefins include high density polyethylene (HDPE), low density polyethylene (LDPE), polypropylene, ethylene-propylene copolymers, and the like. Polyolefin-based substrates provide a recyclable alternative to traditional PVC-based substrates. Polyolefin substrates are the most commonly used alternative to PVC to reduce environmental concerns. One example of a printing article with a polyolefin substrate is available from Hewlett-Packard under the trade name HP HDPE Reinforced Banner. Referring to FIG. 1, element 106 can be a woven HDPE and element 108 can be an extruded HDPE.

Traditional substrates include PVC. Environmental concerns inherent with PVC have forced the printing industry to media with alternative substrates like polyolefins. However, media composed of polyolefins alone tend to suffer from poor performance.

For polyolefin-based substrates, the curing temperature utilized to dry ink (e.g., latex ink) during the printing process must be lower than 90 degrees C. Polyolefin has a melting point close to 130 degree C., so at temperatures higher than 90 degrees C., the polyolefin-based substrate is susceptible to deformation. When polyolefin substrates are cured at temperatures less than 90 degrees C., the substrate exhibits poor durability including dry and wet rubbing resistance of the printed image.

To reduce or eliminate poor image quality and poor wet durability, the media also includes an ink receiving layer (also known as an inkjet receiving layer) 102. As used herein, the "ink receiving layer" refers to one or more layers that receive at least a portion of ink materials being delivered to the media in a printing process.

The ink receiving layer 102 can be arranged at any location and in any orientation in relation to the substrate 106 and/or 108. The ink receiving layer 102 can be disposed within the substrate 106 and/or 108 and/or disposed on the surface of the substrate 106 and/or 108. The polyolefin-based substrate 106 and/or 108 and the ink receiving layer 102 can be used as an alternative to PVC-based substrates, and thereby address the environmental concerns inherent with PVC by eliminating the use of PVC-based substrates.

The ink receiving layer 102 can be positioned on the substrate 106 and/or 108 as a coating. The ink receiving layer 102 can coat at least part of the substrate 106 and/or 108. The ink receiving layer 102 can coat at least 25 percent of the substrate 106 and/or 108. According to another example, the ink receiving layer 102 can coat at least 50 percent of the substrate 106 and/or 108. The ink receiving layer 102 can have a uniform thickness along its entire length from 1 μm to 50 μm. The thickness, in another example, can be from 15 μm to 25 μm.

For example, the coating weight of the ink receiving layer 102 is at least 10 g/m². In another example, the coating weight of the ink receiving layer 102 is at least 20 g/m². Further, the coating weight of the ink receiving layer 102 is at least 30 g/m².

Although a coating is described herein, it is understood that the ink receiving layer 102 can also be impregnated within the substrate 106 and/or 108 so that it is supported by the substrate 106 and/or 108. The ink receiving layer 102 can also take the form of a combination of a coating and an impregnation.

The ink receiving layer 102 can facilitate adhesion of the ink to the media, thereby improving image quality. To this end, the ink receiving layer 102 includes at least one binder. When used herein, the term "binder" generally refers to compositions that have the ability to chemically, physically, electrostatically, or otherwise retain one or more materials together in a given formulation or structure to provide mechanical strength, cohesiveness, or the like.

The binder of the ink receiving layer 102 includes a polymeric binder. The polymeric binder is an ethylene-vinyl alcohol (EVOH) co-polymer. The term "co-polymer" refers to a polymer composition that is the product of two or more different monomers or which is the product of two or more different polymers that are used to form the polymeric structure or backbone.

An EVOH co-polymer is a co-polymer of ethylene and vinyl alcohol. The EVOH co-polymer can have various amounts of ethylene and vinyl alcohol to provide various properties. The amounts of ethylene and vinyl alcohol are selected so that the EVOH co-polymer exhibits a low crystallinity. In other words, the EVOH co-polymer utilized herein is highly amorphous. A highly amorphous EVOH co-polymer with a low crystallinity produces an EVOH co-polymer with good stretchability for use in printing applications.

The highly amorphous EVOH has similar or the same chemical formulation as other types of EVOH. However, the highly amorphous EVOH has a low crystallization temperature compared to other types of EVOH. The low crystallization temperature indicates that the material has a lower tendency to form a crystal structure. The low tendency to form a crystal structure results in a more amorphous structure. In an example, the crystallization temperature of the EVOH is at most 150 degrees C. According to another example, the crystalline temperature of the EVOH is at most 140 degrees C. In a further example, the crystalline temperature of the EVOH is at most 130 degrees C.

The melting point temperature of the highly amorphous EVOH has a melting point temperature that indicates that the material has a lower tendency to bleed or smudge at typical curing temperatures of a printing process. In an example, the melting point temperature of the EVOH is at most 175 degrees C. In another example, the melting point temperature of the EVOH is at most 165 degrees C. According to a further example, the melting point temperature is at most 155 degrees C.

Highly amorphous EVOH also exhibits a glass transition temperature that contributes to its favorable properties. In an example, the glass transition temperature is at most 75 degrees C. According to another example, the glass transition temperature is at most 55 degrees C. In a further example, the glass transition temperature is at most 45 degrees C.

EVOH co-polymers are available commercially from Nippon Gohsei of Osaka, Japan under the trade name SOARNOL™. Amorphous grade of EVOH co-polymers are available commercially from Nippon Gohsei of Osaka, Japan under the trade name G-SOARNOL™. The U.S. supplier for Nippon Gohsei is Soarus, L.L.C. EVOH co-polymers are also available commercially from Eval Company of America of Lisle, Ill. under the trade name EVAL®.

The extrudable ink receiving layer 102 can include additional binders. Examples of additional binders that can be used in the ink receiving layer or other layers include: polyacrylic acid, polyethylene glycol, polyurethanes, polyamide resins, poly(vinyl acetate-ethylene) copolymer, polyacrylate, polymethacrylate, and mixtures thereof.

The ink receiving layer 102 can include additional components. The additional components can include a pigment composition. The term "pigment" generally refers to a material that is used to impart color, opacity, structural support, or the like to a given formulation. The pigment compositions can be organic in nature, inorganic in nature, synthetic or a combination thereof. An example pigment composition is boehmite or pseudo-bohmite.

The additional components can also include a slip agent that reduces friction levels of the ink receiving layer, an ink fixative that chemically, physically, or electrostatically binds with or otherwise fixes the ink materials to, within, or on the ink receiving layer. Various other additional ingredients can be incorporated within the ink receiving layer in addition to or instead of those described above. Examples of additional ingredients include biocides, UV/light protectants and/or absorbents, fade-control agents, fillers, preservatives, wetting agents, plasticizers, and the like.

If desired, the substrate 106 or 108 can be at least partially coated with a selected coating material or formulation that is substantially non-porous, non-absorbent, and ink-permeable. The coating layer can have a uniform thickness from 1 µm to 40 µm. According to another example, the coating layer can have a uniform thickness from 10 µm to 30 µm.

The coating layer can be produced from a number of compositions. The compositions are selected according to a number of factors, including the type of ink being delivered, the printing system in which the media will be used, and the like. Polyethylene is a representative non-porous, non-ink-absorbent coating layer. Other compositions that can be employed to achieve a non-porous, non-ink-absorbent coating layer include various organic polymers, such as polystyrene, polyethylene terephthalate, polycarbonate, resins, polytetrafluoroethylene, polyamide, polypropylene, cellulose acetate, acrylate, or mixtures thereof.

The coating layer can include a variety of other ingredients to form a more absorbent layer of material. These various ingredients include one or more pigments, binders, fillers, UV/light stabilizers, slip agents, preservatives, or the like.

The media can also employ an additional layer of material or "tie layer" 104 or "intermediate layer." The tie layer 104 can have a thickness value from 1 µm to 50 µm. The tie layer 104 can also have a thickness from 10 µm to 40 µm.

The tie layer 104 can be made from a number of different ingredients. The different ingredients can include pigments, binders, fillers, UV/light stabilizers, general stabilizers, ink fixatives, and the like.

The media 100 can be made by contacting the binder of the ink receiving layer to the substrate. The binder of the ink receiving layer can be incorporated within the substrate. The binder, additionally or alternatively, can be coated on the surface of the substrate. Additional layers and/or coatings can be similarly added to the substrate.

The media 100 can be produced according to an extrusion coating process. An extrudable EVOH co-polymer resin can be extruded on the surface of the polyolefin-based substrate 106 and 108 to form the ink receiving layer 102. The lower crystallinity of the extrudable EVOH co-polymer improves the compatibility between different polymers, leading to faster extrusion coating speed and lower manufacturing costs.

The extrusion coating can occur at temperatures up to 320 degrees C. The process of extrusion coating involves extricating resin from a slot die onto a moving web, which is then passed through a nip including a rubber covered pressure roller and a chrome plated chill roll, which cools the molten film back into the solid state and also imparts the desired finish to the plastic surface.

According to another example, the extrusion coating process can lead to a four-layer construction of the media 100. A scrim 106 can be used as the middle of the polyolefin-based substrate. The scrim 106 can be any substance that provides structure, integrity, or the like to the media 100. The scrim 106 provides added adhesion to further support layers so that the media can be employed for its intended use. The scrim 106 can be a polyolefin.

A polyolefin, like HDPE 108, can be extruded to the back side of the scrim to make a HDPE substrate. A tie layer 104 can be extruded onto the front side. The ink receiving layer 102 can be extruded on to the surface of the front side of the substrate to make the final media 100.

The media 100 with the polyolefin-based substrate and the extrudable EVOH co-polymer ink receiving layer has advantages over traditional PVC-based media. The media with the polyolefin-based substrate and the EVOH co-polymer ink receiving layer is recyclable and environmentally friendly. Since the media 100 with the polyolefin-based substrate and the EVOH co-polymer ink receiving layer contains no chlorine, all of the environmental concerns regarding the use of chlorine are alleviated.

The media 100 with the polyolefin-based substrate and the EVOH ink receiving layer also has advantages over non-coated polyolefin-based substrates. When the curing temperature is set higher than 90 degrees C., the polyolefin-based substrate film will deform due to its lower melting point, which is close to the curing temperature. Accordingly, curing temperatures must be set lower than 90 degrees C. for polyolefin-based substrates, resulting in poor wet durability. The extrudable, amorphous EVOH co-polymer ink receiving layer leads to an improved wet durability of the printed image when compared to uncoated polyolefin-based substrates and polyolefin-based substrates with a more crystalline EVOH co-polymer ink receiving layer. Additionally, the extrudable amorphous EVOH co-polymer ink receiving layer also leads to an improved overall image quality, including an improved color gamut, an improved coalescence, and an improved bleed control.

The extrudable amorphous EVOH co-polymer used in the ink receiving layer has additional advantages over other more-crystalline EVOH co-polymers. The extrudable amorphous EVOH co-polymer has a better stretchability compared to more crystalline EVOH co-polymer.

EXPERIMENTAL

EVOH Co-Polymers

FIG. 2 illustrates a comparison between Soarnol E3808 EVOH co-polymer and G-Soarnol SG654B EVOH co-polymer. As shown in FIG. 2, both Soarnol E3808 and G-Soarnol SG654B have the same chemistry. However, G-Soarnol SG654B has a lower crystallization temperature than Soarnol E3808. The crystallization temperature represents the temperature that the material starts to crystallize as the temperature drops. Accordingly a lower crystallization temperature represents that the material has a lower tendency to form a crystal structure, resulting in forming a more amorphous structure. Because G-Soarnol SG654B has a lower crystallization temperature than Soarnol E3808, G-Soarnol SG654B is more amorphous and less crystalline than Soarnol E3808.

Preparation of Media with Different Ink Receiving Layers

Media were prepared according to an extrusion process at a process temperature of 230 degrees C. Each media had a polyolefin substrate that included an extruded HDPE back coat and a HDPE woven layer. The tie layer was made of Lotader 5500 with an 80 dry wt. ratio (%) and Lotader 4210 with a 20 dry wt. ratio (%). The compositions of the ink receiving layer were varied, as shown in FIG. 3.

In the first Control (Control 1), the ink receiving layer included 100% dry wt. of Soarnol E3808.

In the second Control (Control 2), the ink receiving layer included 80% dry wt. of Soarnol E3808 and 20% dry wt. of Orevac 9304, an ethylene-vinyl acetate (EVA).

In Examples 1-4, the ink receiving layer included a more amorphous G-Soarnol (G-Soarnol GS634 and G-Soarnol GS654B).

In Example 1, the ink receiving layer included 100% dry wt. of G-Soarnol GS634.

In Example 2, the ink receiving layer included 100% dry wt. of G-Soarnol GS654B.

In Example 3, the ink receiving layer included 80% dry wt. of G-Soarnol GS634 and 20% dry wt. of Orevac 9304.

In Example 4, the ink receiving layer included 80% dry wt. of G-Soarnol GS654B and 20% dry wt. of Orevac 9304.

These samples were then printed using an HP DESIGNJET® L25500 with a 10 pass print mode and cured at 80 degrees C. and held for 24 hours, after which image quality and durability evaluations were performed.

Image Quality

As shown in FIG. 4, the image quality for Control 1, Control 2 and Examples 1-4 were determined in terms of color gamut and average image gloss at 60 degree.

The color gamut was measured using an industrial standard Spetrolino Spectrophotometer by measuring 72 colors. Higher numbers are better in terms of color gamut. In the first group of Control 1, Example 1 and Example 2, each of Example 1 and Example 2 exhibited better color gamut than the Control 1. In the second group of Control 2, Example 3 and Example 4, Example 4 exhibited a better color gamut than Control 2.

With regard to average image gloss at 60 degree, higher numbers also reflect a better image gloss. In group 1, Example 2 exhibited better image gloss than the control (control 1). In group 2, Example 4 exhibited better image gloss than the control (control 2).

Durability

As shown in FIG. 5, the rubbing durability was determined for Control 1, Control 2, and Examples 1-4. The rubbing durability was measured using a Taber Rub Tester. The rank for water rub after 5 cycles, Windex rub after 5 cycles, and dry rub after 5 cycles were based on a visual ranking on a 1 to 5 scale with 1 being the worst and 5 being the best.

In the group of Control 1, Example 1, and Example 2, Example 2 showed better water rub, Windex rub and dry rub durability compared to Control 1. In the group of Control 2, Example 3, and Example 4, Example 3 and Example 4 showed better water rub, Windex rub and dry rub durability than Control 2.

Manufacturability

Polymer miscibility, a manufacturability characteristic, of Control 2, Example 3, and Example 4 is shown in FIG. 6. The polymer miscibility rankings are based on a visual ranking on a scale of 1 to 5, with 5 being the best. Example 4 exhibited a higher polymer miscibility than Example 3, which exhibited a higher polymer miscibility than Control 2.

Physical Properties

FIG. 7 is a chart displaying physical properties of Control 1, Example 1, and Example 2. Control 1 has a melting temperature of 173 degrees C., a glass transition temperature of 58 degrees C., and a crystallization temperature of 152 degrees C. Example 1 has a melting temperature of 175 degrees C., a glass transition temperature of 59 degrees C., and a crystallization temperature of 153 degrees C. Example 2, which exhibited superior image quality, and durability to both Control 1 and Example 1 has a melting temperature of 160 degrees C., a glass transition temperature of 53 degrees C., and a crystallization temperature of 129 degrees C.

Numerical data, such as temperatures, concentrations, times, ratios, and the like, are presented herein in a range format. The range format is used merely for convenience and brevity. The range format is meant to be interpreted flexibly to include not only the numerical values explicitly recited as the limits of the range, but also to include all the individual numerical values or sub-ranges encompassed within the range as if each numerical value and sub-range is explicitly recited.

When reported herein, any numerical data is meant to implicitly include the term "about." Values resulting from experimental error that can occur when taking measurements are meant to be included in the numerical data.

Many variations and modifications can be made to the above-described examples. All such modifications and variations are intended to be included herein within the scope of the disclosure and protected by the following claims. It will be noted that the singular forms "a," "an," and "the" include plural references unless the context clearly indicates otherwise.

What is claimed is:

1. A media composition, comprising:
    a substrate; and
    an ink receiving layer, comprising a binder that includes an ethylene-vinyl alcohol co-polymer with a crystallization temperature of 140 degrees Celsius or less, and an ethylene-vinyl acetate co-polymer.

2. The media composition of claim 1, wherein the binder includes the ethylene-vinyl alcohol co-polymer with a glass transition temperature of 75 degrees Celsius or less.

3. The media composition of claim 1, wherein the binder includes the ethylene-vinyl alcohol co-polymer with a melting point temperature of 175 degrees Celsius or less.

4. The media composition of claim 1, wherein the ink receiving layer has a coating weight of at least 10 g/m$^2$.

5. The media composition of claim 1, wherein the ink receiving layer has a coating weight of at least 20 g/m$^2$.

6. A binder composition for application within an ink receiving layer of a media, comprising:
    an ethylene-vinyl alcohol co-polymer with a crystallization temperature of 140 degrees Celsius or less; and
    an ethylene-vinyl acetate co-polymer.

7. The binder composition of claim 6, wherein the glass transition temperature is 55 degrees Celsius or less.

8. The binder composition of claim 6, wherein the ethylene-vinyl alcohol co-polymer has a melting point temperature of 175 degrees Celsius or less.

9. The binder composition of claim 6, wherein the melting point temperature is 165 degrees Celsius or less.

10. The binder composition of claim 6, wherein the ethylene-vinyl alcohol co-polymer has an ethylene concentration greater than 38 wt. %.

11. The binder composition of claim 6, wherein the ethylene concentration is greater than 50 wt. %.

12. A method for making a media composition, comprising:
    extrusion coating a binder on a surface of a substrate, the binder comprising:
        an amorphous ethylene-vinyl alcohol co-polymer with a glass transition temperature of 75 degrees Celsius or less, a melting point temperature of 175 degrees Celsius or less, and a crystallization temperature of 140 degrees Celsius or less; and
        an ethylene-vinyl acetate co-polymer.

13. The media composition of claim 1, wherein the substrate comprises:
    a scrim;
    a polyolefin layer extruded onto a back side of the scrim; and a tie layer extruded onto a front side of the scrim;
and wherein the ink receiving layer is extruded onto a front side of the tie layer.

\* \* \* \* \*